United States Patent [19]
Shima

[11] Patent Number: 5,847,693
[45] Date of Patent: Dec. 8, 1998

[54] MINIATURIZED OPERATING PANEL FOR A PRINTER

[75] Inventor: Toshihiro Shima, Nagano, Japan

[73] Assignee: Seiko Epson Corporation, Tokkyo, Japan

[21] Appl. No.: 688,115

[22] Filed: Jul. 29, 1996

[30] Foreign Application Priority Data

Jul. 27, 1995 [JP] Japan ................................. 7-192295

[51] Int. Cl.[6] ......................................................... G09G 5/00
[52] U.S. Cl. ............................................ 345/156; 345/184
[58] Field of Search ..................................... 345/156, 184; 364/709.01, 709.15, 709.16; 399/81

[56] References Cited

U.S. PATENT DOCUMENTS

| | | | |
|---|---|---|---|
| 4,258,426 | 3/1981 | Balzarini et al. | ......................... 364/518 |
| 4,779,079 | 10/1988 | Hauck | ....................................... 345/156 |

FOREIGN PATENT DOCUMENTS 0 399 887  11/1990  European Pat. Off. ........ G05B 19/10

OTHER PUBLICATIONS

NEC Pinwriter P2200 User's Guide pp. 2–5, Jan. 1988.
Patent Abstracts of Japan vol. 009, No. 282, (M–428), Nov. 9, 1985, & JP 60 123250 A (Mitsubishi Jukogyo KK) Jul. 1, 1985 *Abstract*.
Patent Abstracts of Japan vol. 010, No. 342 (M–536), Nov. 19, 1986, & JP 61 143169 A (NEC Corp) Jun. 30, 1986 *Abstract*.
Patent Abstracts of Japan vol. 012, No. 269 (M–723), Jul. 27, 1988 & JP 63 051165 A (Canon Inc), Mar. 4, 1988 *Abstract*.

*Primary Examiner*—Jeffery Brier
*Attorney, Agent, or Firm*—Sughrue, Mion, Zinn, Macpeak & Seas, PLLC

[57] ABSTRACT

A miniaturized operating panel for a computer printer is provided which is simplified and miniaturized. The operating panel has a single operating button (2), a yellow display lamp (4), and a red display lamp (6). When the printer's power switch is turned on while the button (2) is kept depressed, the printer enters a function setting mode. In the function setting mode, first the yellow display lamp (4) flickers. When, during the flickering of the lamp (4), the user depresses the button (2) at least once, the first digit of a desired number is inputted in correspondence to the number of times of depression of the button. Subsequently, the red lamp (6) flickers. Similarly, the user depresses the button while the lamp (6) flickers, to input the second digit. After the second digit has been entered, both lamps (4, 6) flicker, and similarly the third digit is inputted. In this way, a three-digit setting code is inputted, so that a function item is set in the printer in correspondence to the setting code. Thereafter, the yellow lamp (4) flickers again to prompt input of another setting code.

16 Claims, 6 Drawing Sheets

FIG. 3

| SETTING ITEM | | SETTING VALUE | SETTING CODE |
|---|---|---|---|
| (MENU) | (ITEM) | | |
| (FINISH INITIAL SETTING CODE) | | | 111 |
| PARALLEL | SPEED | FAST | 112 |
| | | SLOW | 113 |
| | Bi - D | ON | 114 |
| | | OFF | 115 |
| SERIAL | WORD LENGTH | 8 | 121 |
| | | 7 | 122 |
| | BAUD RATE | 9600 | 123 |
| | | 19200 | 124 |
| | | 38400 | 125 |
| | | ⋮ | ⋮ |
| | | ⋮ | ⋮ |
| | | ⋮ | ⋮ |
| | ⋮ | ⋮ | ⋮ |
| | ⋮ | ⋮ | ⋮ |
| | ⋮ | ⋮ | ⋮ |
| EMULATION | PARALLEL | LJ4 | 211 |
| | | ESCP2 | 212 |
| | | FX | 213 |
| | | ⋮ | ⋮ |
| | | ⋮ | ⋮ |
| | | ⋮ | ⋮ |
| | SERIAL | LJ4 | 232 |
| | LT | | |
| | AUX | | |
| | ⋮ | ⋮ | ⋮ |
| | ⋮ | ⋮ | ⋮ |

FIG. 4

| SETTING ITEM | | SETTING VALUE | SETTING CODE |
| --- | --- | --- | --- |
| (MENU) | (ITEM) | | |
| ESCP2 FX | CGTable | PcUSA | 253 |
| ESCP2 FX | CGTable | Italic | 254 |
| ESCP2 FX | CGTable | PcMultilin | 255 |
| ESCP2 FX | CGTable | PcPortugue | 311 |
| ESCP2 FX | CGTable | PcCanFrenc | 312 |
| ESCP2 FX | CGTable | PcNordic | 313 |
| ESCP2 FX | CGTable | PcTurkish2 | 314 |
| ESCP2 FX | CGTable | PcE.Europe | 315 |
| ESCP2 FX | CGTable | BpBRASCII | 321 |
| ESCP2 FX | CGTable | BpAbicomp | 322 |

MINIATURIZED OPERATING PANEL FOR A PRINTER

BACKGROUND OF THE INVENTION

1. Field of the Invention

The present invention relates to the field of operating panels, and more specifically, it relates to the field of operating panels for printer devices.

2. The Background Art

In general, an operating panel for an apparatus having a number of operating functions has a plurality of switches or buttons to perform those functions. Commonly, such an operating panel would also have a liquid crystal display unit and a number of LED lamps to indicate the various states of the apparatus.

In the specific case of a computer printer, the control panel generally has several operating buttons, several LED lamps, and a liquid crystal display unit which has a display surface on the order of several to ten square centimeters in area. Thus, the size of the operating panel is at least several tens of square centimeters in area.

This becomes a problem when an apparatus is to be miniaturized. Miniaturization is desirable inter alia because it decreases manufacturing costs for the apparatus and allows the apparatus to be installed in a smaller apace than before. However, the large area requirement of a conventional operating panel is inconsistent with miniaturization of an apparatus.

SUMMARY OF THE INVENTION

Japanese patent application no. Hei. 7-192295 is incorporated by reference into this application.

In the case of a computer printer, as mentioned above, it is desirable to miniaturize the printer as much as possible so that it takes up a narrow space on the top of a desk or other work surface. Thus, it is also desirable to reduce the size of the operating panel. As a competing interest, though, it is also desirable that the operating panel be simple to use and that the need for operating the switches or buttons on the operating panel and checking the display be reduced as much as possible. Additionally, in order to produce printers for many buyers at a low price, it is important that the operating panel be simple in structure.

Accordingly, an object of the invention is to provide an operating panel which is simple in structure and small in size when compared with the conventional operating panel.

An operating panel for an apparatus, according to the invention, includes: (1) a single button and (2) a setting means. When the operating button is operated within an inputting period of time, the setting means recognizes a setting code inputted from the operating button based upon how the button is operated, and sets for the apparatus a functional item corresponding to the recognized setting code. The recognized setting code is selected from among a plurality of possible setting codes corresponding to a plurality of functional items which may be set for the apparatus.

In the operating panel according to the present invention, when the single operating button is operated during the inputting period of time, a setting code is selectively inputted to the apparatus according to the way the operating button is operated. One or more functional items are selectively set in the apparatus according to the setting code which is thus inputted.

The way the operating button is operated typically means the number of times the button is depressed. However, the invention is not limited to that mode of use. That is, the differentiation of how the button is operated may be based upon the length of time the button is depressed.

Preferably, the panel also includes: (3) at least one display lamp; and (4) display control means for driving and controlling the display lamp. The display control means turns on the display lamp in a specific way for the inputting period of time, so as to indicate to the user that it is the inputting period of time.

When the power switch of the apparatus is turned on with the operating button depressed, the setting means is started. The setting means provides the inputting period of time repeatedly to input a plurality of setting codes. During each inputting period of time, a setting code is recognized from the number of times the operating button is depressed. When the setting code thus recognized is equal to a predetermined setting completion code, the setting means terminates its operation. When the operation of the setting means is terminated, the display control means turns on the display lamp to indicate the state of the apparatus.

According to the present invention, the function setting mode of the operating panel is initiated simply by using the operating button when the power switch is turned on. Once the function setting mode is initiated, all the necessary functional items can be set by repeatedly operating the button. The appropriate period of time for operating the button is indicated by the display lamp. Once all the necessary functional items have been set, a simple specific operation of the operating button terminates the function setting mode. Thereafter, the display lamp functions simply to indicate the state of operation of the apparatus.

Each setting code may be made up of a single digit or plural digits. For instance, in a preferred embodiment of the invention, each setting code is a three-digit number. In the three-digit case, a sufficiently large number of different setting codes can be provided, yet it is not very troublesome for the user to input a three-digit number. In the three-digit number, each digit may be any figure. However, the figures applied to each digit are limited so that they are suitable for allowing the user to easily input the three-digit number. Preferably, the number of figures is in the range of two to five.

Furthermore, in the preferred embodiment, the number inputted is recognized by counting the number of times the button is depressed. If, for example, the number of times of depression exceeds the maximum permissible number of five, then it is determined that the inputting of the setting code has been canceled. Hence, in the case where the user has made a mistake in inputting the number, the inputting operation can be started all over again merely by depressing the button more than five times.

Thus, in the preferred embodiment of the invention, the setting code which is being inputted is canceled when the number of times of depression of the button exceeds five. However, the invention is not limited to that specific mode of operation. For instance, the invention may be alternatively embodied as follows: In the case when the number of times the button is depressed exceeds five (the maximum permissible number), only the digit which is being inputted is canceled, however, the digit or digits which have been previously inputted are maintained as effective inputs (i.e., not canceled).

Or as another alternative embodiment, when the number of times the button is depressed exceeds a predetermined value (say, for example, seven), or the button is kept continuously depressed for more than a predetermined period of time, the digit or digits which have been inputted and the setting code itself are canceled.

Of a plurality of possible setting codes which may be inputted, at least one setting code corresponds to more than one functional item. By inputting a single setting code which corresponds to more than one functional item, a plurality of functional items are set. Furthermore, only one of the plurality of functional items corresponding to the setting code is fixedly used for the apparatus. Thus, even if a plurality of functional items is set, no trouble is caused with the operation of the apparatus. This feature is provided to allow smooth operation of the apparatus even in the case where the number of functional items which can be set is larger than the number of different possible setting codes.

BRIEF DESCRIPTION OF THE DRAWINGS

FIGS. 3 and 4 are diagrams indicating setting codes and setting values.

DETAILED DESCRIPTION OF THE PREFERRED EMBODIMENT

A preferred embodiment of the invention will be described with reference to the accompanying drawings.

Figure 1:
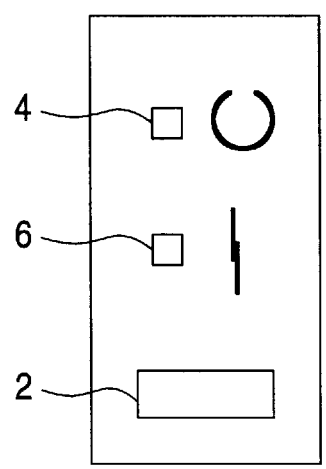
FIG. 1 is a plan view showing the external appearance of an operating panel according to a preferred embodiment of the invention.

FIG. 1, shows an external appearance of an operating panel for a printer, according to the present invention. The operating panel shown in FIG. 1 has an operating button 2 and two LED lamps 4, 6. In addition to the operating panel, the printer is provided with a power switch (not shown). The operating button 2 is used to selectively set the various operating functions of the printer (as described in detail, below). Lamp 4 is yellow and lamp 6 is red. Any one of the operating functions of the printer is indicated by means of those two lamps. During an ordinary operating time (i.e., not during the function selecting mode), the yellow lamp 4 indicates the on- and off-states of the printer power switch and whether the printer is receiving data from a host computer, and the red lamp 6 indicates whether or not the printer is operating in a normal manner. In FIG. 1, those functions of the lamps 4 and 6 are indicated by symbol marks provided on the right side of them. The printer has a power switch (not shown).

Operation of the operating panel is now explained. When the power switch is turned on under the condition where the button 2 is not depressed, the printer enters an ordinary operation mode in which the printer receives data from the host computer to perform a printing operation and other operations as required by the data. In this ordinary mode, the yellow lamp 4 indicates the conditions of the power source and the incoming data, and the red lamp 6 indicates the presence or absence of abnormal conditions.

On the other hand, when the power switch is turned on with the button 2 depressed, the printer enters a function setting mode in which various functions of the printer may be selectively set. When the printer is shipped out of the factory, all the function settings of the printer are default settings. When the printer is placed in the function setting mode, each default setting may be changed to a setting desired by the user (a setting mode being referred to as "an initial setting mode"), or the settings made by the user may be changed back to the original default settings.

The functions which may be set in the above-described manner are, for instance, a communication function, emulation function, printer language, status sheet describing language, printing format, and resolution. The setting of those functions can be achieved by operating the power switch and the operating button to invoke the function setting mode, or may be set as follows: With the printer connected to a host computer, the host computer executes a predetermined printer utility program, so that the setting of the functions is achieved according to command data supplied from the host computer. In the latter case, the user is able to perform the function setting operation while watching the screen of the display unit of the host computer. Hence, from the user's point of view, the setting of the functions by means of the host computer is easier than the setting of the functions by means of the power switch and the operating button. However, since correct setting of the communication function is necessary to enable accurate communications with the host computer, it must be set to a suitable setting for the host computer by invoking the function setting mode by operating the power switch and the operating button. Of course, no function setting operation is required in the case where the default communication settings are adequate for the host computer.

The above-listed functions are equivalent to those which a conventional printer is able to set, and are not directly related to the present invention. Thus, no concrete description of these function is made here.

Figure 2:
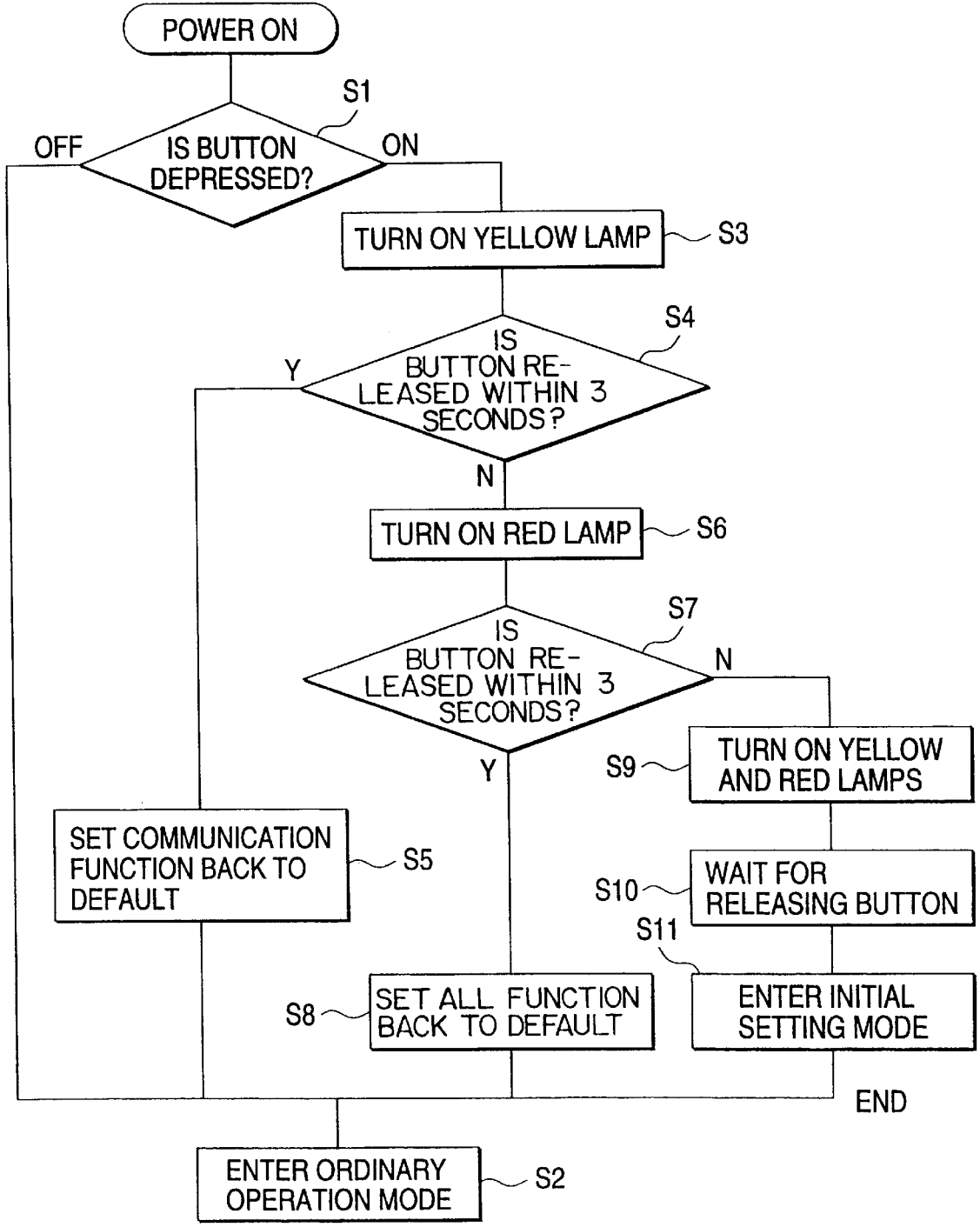
FIG. 2 is a flow chart of the operation of the operating panel.

The function setting operation using the operating panel will now be described. FIG. 2 shows a flow chart describing the control of operation modes of the printer when the power switch is turned on. This control process is carried out by a microcomputer in the printer which is connected to the operating panel. In the microcomputer, the contents of various functions to be set have been stored in an EEPROM. The hardware, such as an EEPROM coupled with a microcomputer in a printer, is well known in the art, and therefore further description of the hardware will not be made here.

As shown in FIG. 2, when the power switch is turned on, the microcomputer first detects whether or not the button 2 is depressed (Step S1). When the button 2 is not depressed yet, the microcomputer enters an ordinary operation mode (Step S2). In this ordinary mode, the microcomputer receives data from the host computer, and performs printing operations specified by the data thus received.

In the case where the button 2 has been depressed when the power switch is turned on, only the yellow lamp 4 is turned on (Step S3), and it is detected whether or not the depression of the button 2 is stopped within three (3) seconds (Step S4). In the case where the depression of the button 2 is stopped within three seconds, only the communication function (among the various functions set when the printer is shipped out of the factory) is reset to the default settings which were originally set when the printer was shipped out of the factory (Step S5).

It is suitable to perform the above-described operation in the case where the host computer is changed, or in the case where a mistake is made in attempting to set the printer functions, so that the current state of the communication setting becomes unknown. This is useful because, if only the communication function is set back to the default, then the communication function can be quickly corrected so as to be suitable to the host computer (assuming the factory defaults are appropriate to the host computer). When the communication function has been corrected in the above-described manner, then even if the present states of the other functions are unknown, those functions can be set again as desired by using the utility program of the host computer.

In the case where the button is continuously depressed for more than three seconds from the time instant that the power switch is turned on, then only the red lamp 6 is turned on (Step S6), and it is detected whether or not the depression of the button 2 is stopped within three seconds from the time instant the red lamp 6 is turned is turned on (Step S7). In the case where the depression of the button 2 is terminated within the three seconds, all the functions of the printer which have been set are reset to the default values as set when the printer was shipped out of the factory (Step S8).

This function is also suitably employable in the case where the host computer is changed, or in the case in which the current state of the settings becomes unknown. This is useful because, if all the functions are set back to their defaults, then the current states of setting become known, so that desired functions can be set as required merely by using the operating button 2.

In the case where the depression of the button 2 is continued for more than three seconds in Step S7, both the yellow lamp and the red lamp are turned on (Step S9), and the microcomputer waits until the button 2 is released, and enters the initial setting mode (Step S11). In the initial setting mode, the above-described various functions of the printer can be freely set as desired merely by operating the button.

After the initial setting mode is terminated, the ordinary operation mode is effected (Step S2).

The initial setting mode will now be described in detail. In the initial setting mode, three-digit numbers are inputted by depressing the button 2, and setting contents corresponding to the three-digit numbers are stored in the EEPROM. FIGS. 3 and 4 show examples of the relationships between the three-digit numbers and the setting contents.

In FIGS. 3 and 4, the column of "Setting Item" is for function items which can be set to different settings. In the column of "Setting Item", the "MENU" column is for major items, and the "ITEM" column is for minor items which are obtained by subdividing the major items. The column of "Setting Value" is for the content options which can be set for the minor items, and the column of "Setting Code" is for three-digit numbers corresponding to the setting contents.

For instance, in the column of "MENU", "PARALLEL" means a parallel communication function, "SERIAL" means a serial communication function, and "EMULATION" means an emulation function. In the column of "ITEM", in the portion of the column corresponding to "PARALLEL", "SPEED" means the speed of parallel communication, and "Bi-D" means a two-way communication function. In the column of "Setting Value", in the portion of the column corresponding to "Bi-D", "ON" means to perform a two-way communication, and "OFF" means to perform a one-way communication only.

As shown in FIGS. 3 and 4, the setting codes are shown as having three digits, and the figures of each digit are limited to "1" to "5". This is to simplify the operation of inputting digits with a single button 2, to thereby eliminate the occurrence of error. Each digit is inputted by depressing the button 2 the number of times corresponding to the value of the digit, and this operation is repeated three times, to input a desired three-digit number. In this regard, the fact that each digit is at most "5" is suitable for preventing the user (or operator) from making an error in the digit inputting operation, and the fact that the number of digits is at most three is suitable for allowing the user to mentally keep account of the number of digits accurately.

It is also shown in FIGS. 3 and 4 that sometimes a plurality of setting contents are provided by a single setting code. For instance, as shown in FIG. 4, the setting code "322" concerns two major items "ESCP2" and "FX", and corresponds to the set value "BpAbicomp" of the minor item "CGTable". This means that, when "322" is inputted, "CGTable" in "ESCP2" is set to "BpAbicomp", and "CGTable" in "FX" is also set to "BpAbicomp". In the column of "MENU", "ESCP2" and "FX" means two different printer language systems, and selection of one of the language systems depends on the kind of host computer. Hence, in one computer system, only one of the language systems is employed, and the other language system is not used at all.

As was described above, plural setting contents, only one of which is fixedly used, are assigned to one setting code. Hence, the number of setting contents is larger than the number of variations of setting codes. That is, since each setting code is a three-digit number in which each digit is 1, 2, 3, 4 or 5, the number of variations is 125. However, the actual number of variations is 124, because as shown in FIG. 3 the setting code "111" is assigned to cause termination of the initial setting mode. On the other hand, in the printer, the number of kinds of contents which are to be set therein is much larger than 124. Hence, plural setting contents which are, for all practical purposes, not contradictory to each other and cause no problem even if set in duplex, are assigned to one setting code. This feature makes it possible to set all the setting contents which are substantially necessary for the printer.

Figure 5:
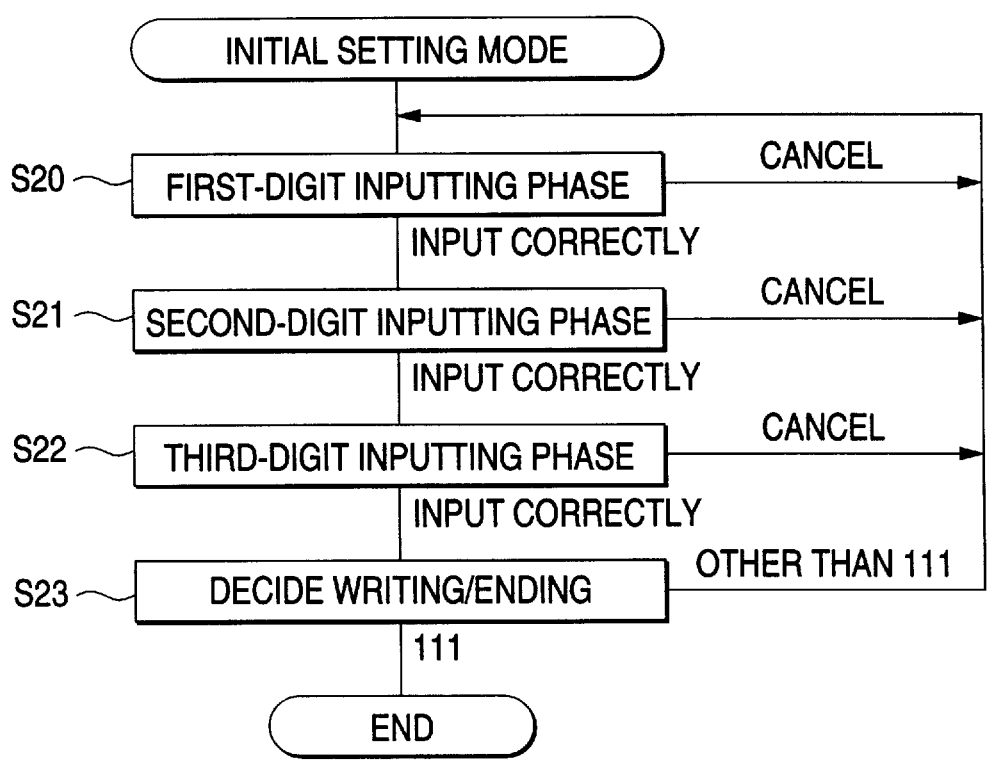
FIG. 5 is a flow chart showing operations in an initial setting mode.
Figure 6:
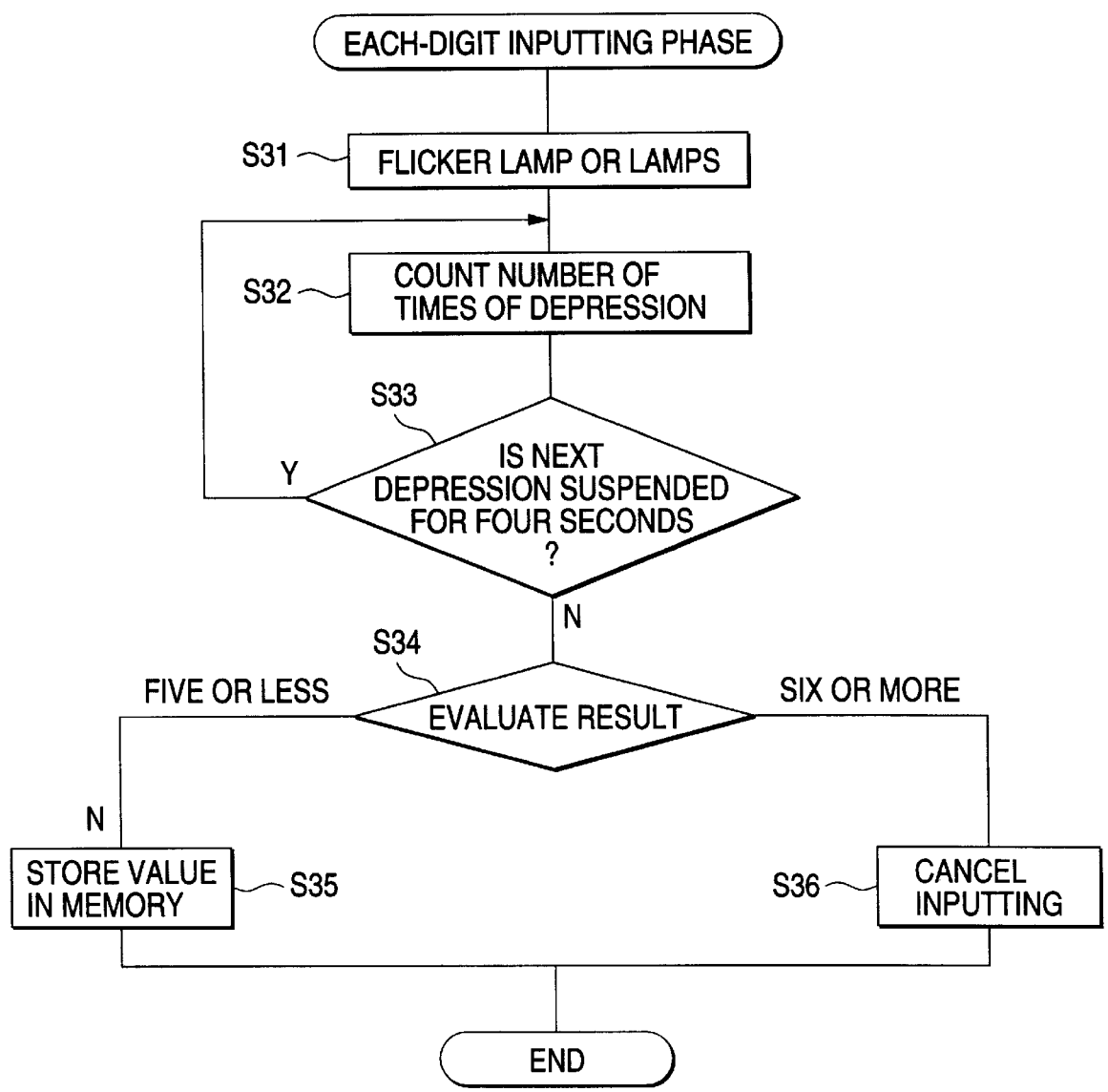
FIG. 6 is a flow chart showing operations in each digit inputting phase.

FIGS. 5 and 6 are flow charts showing the operation of the microcomputer in the initial setting mode. When, as shown in FIG. 5, the microcomputer enters the initial setting mode, first a first-digit inputting phase is effected (Step S20). When it is determined that, in the first-digit inputting phase, a desired digit is correctly inputted, then a second-digit inputting phase is effected (Step S21). In this case, too, when it is determined that, in the second-digit inputting phase, a desired digit is correctly inputted, then a third-digit inputting phase is effected (Step S22). When, in Step S22, it is determined that a desired digit is correctly inputted, then a setting value writing/ending deciding operation is effected (Step S23).

If, in Step S23, the setting code of three digits is "111", then the initial Betting mode is ended. When the setting code is other than "111", then it is stored in the EEPROM, and Step S20 (the first-digit inputting phase) is effected again for inputting the next setting code.

When it is determined that, in any one of the first-through third-digit inputting phases S20–S22, the digit inputting operation is canceled, no matter what the digit is, the digit or digits which have been inputted are erased out of the memory. The first-digit inputting phase (Step S20) is effected again to start over inputting digits.

The operations in each of the first- through third-digit inputting phases are as shown in FIG. 6. First of all, one or both of the lamps are caused to flicker (Step S31). The flickering of the lamp or lamps is to indicate the place of a digit to be inputted. For instance, in inputting the first digit, the yellow lamp is caused to flicker; in inputting the second digit, the red lamp is caused to flicker; and in inputting the third digit, both the yellow lamp and the red lamp are caused to flicker. In this way, the user is given a visual prompt as to which digit, in order, the microcomputer is awaiting input of.

While the lamp is flickering, the number of times of depression of the button 2 is counted (Step S32), and the next depression of the button 2 is suspended for a predetermined period of time (for instance four seconds) (Step S33), If the next depression of the button occurs during the predetermined period of time, then Step S32 is effected again, and the number of times of depression of the button 2 is increased by one, and the value stored in the memory is renewed. If the predetermined period of time (4 sec.) passes without the next depression of the button, an operation-result deciding process is performed (Step S34).

In the Step S34, it is determined whether or not the number of times of depression is five or less or whether or not the number of times of depression is six or more. In the case where the number of times of depression is five or less, it is decided that the digit of that place has been correctly inputted, and the value stored in the memory is determined as the digit of that place (Step S35), and the following digit inputting phase is effected.

On the other hand, when, in the operation-result deciding process (Step S34), the number of times of depression counted is six or more, it is decided that the inputting of the setting code has been canceled, and the digit of the previous place and the digit of the current place are erased out of the memory (Step S35). Thereafter, the first-digit inputting phase is effected again.

As was described above, merely by operating only one button, a desired function (setting value) can be set. As is apparent from the above description, the first-digit inputting phase, the second-digit inputting phase, and the third-digit inputting phase occur repeatedly, so that a plurality of setting codes can be set one after another. When all the necessary codes have been inputted, the inputting mode is switched over to the ordinary operation mode merely by inputting "111".

If the user makes a mistake in inputting the digits, then the data which have been inputted are canceled by depressing the operating button more than five times so that the user can input the digits all over again. On the other hand, if at least the communication function is set, then the remaining functions may be set by means of the host computer using a printer utility program.

In the case where it is required to change a function into the default, or it is necessary to obtain the initial setting mode again to change the setting, those changes can be achieved readily by selecting the duration of depression of the operating button when the power switch is turned on again.

In the initial setting mode, the user repeatedly performs the action of entering digits by repeatedly depressing the button 2 according to a manual setting code table (similar to that shown in FIGS. 3 and 4) and the number of times of depression of the button 2 is counted. Hence, the operation may be troublesome to the user until the user becomes used to it. However, once the user becomes used to the operation, then the user may think the operations to be relatively simple, because all the functions can be set or canceled by operating only one button, and it is unnecessary for the user to read and understand a character message displayed on an LCD display unit.

As a result of the simplicity of the structure of the operating panel as described above, the operating panel is considerably small in size. This feature makes it possible to miniaturize the printer and to reduce the space for installation of the printer. Thus, the resultant printer is convenient in use, and has a reduced manufacturing cost.

Although a preferred embodiment has been described, it will be understood by those of ordinary skill in the art that modifications can be made without departing from the spirit and scope of the invention.

What is claimed is:

1. An operating panel for an apparatus comprising:

a single operating button;

setting means for recognizing a setting code inputted via said operating button when said operating button is operated within a predetermined inputting period of time, and for setting a functional item of the apparatus corresponding to said setting code thus recognized;

one or more display lamps; and display control means for driving and controlling said one or more display lamps;

wherein said functional item is among a plurality of functional items which may be set for the apparatus; and wherein said display control means turns on said one or more display lamps in a predetermined manner during said inputting period of time.

2. The operating panel as claimed in claim 1, wherein said setting means recognizes said setting code by counting the number of times of depression of said operating button during said inputting period of time.

3. The operating panel as claimed in claim 2, wherein said setting means recognizes the number of times of depression of said operating button only when the number of times of depression of said operating button during said inputting period of time is equal to or less than a predetermined maximum number.

4. The operating panel as claimed in claim 3, wherein when the number of times of depression of said operating button during said inputting period of time exceeds said predetermined maximum number, said setting means clears a value representing the number of times of depression of said operating button which has been counted during said inputting period of time.

5. The operating panel as claimed in claim 1, wherein said setting means provides said inputting period of time repeatedly so as to input a plurality of setting codes.

6. An operating panel for an apparatus, comprising:

a single operating button; and setting means for recognizing a setting code inputted via said operating button when said operating button is operated within a predetermined inputting period of time, and for setting a functional item of the apparatus corresponding to said setting code thus recognized;

wherein said functional item is among a plurality of functional items which may be set for the apparatus;

wherein said setting means provides said inputting period of time repeatedly in succession so as to input a plurality of setting codes; and wherein a setting completion code for the completion of a function setting mode of the apparatus is determined in advance, and when said recognized setting code is equal to said setting completion code, said setting means terminates the function setting mode.

7. The operating panel as claimed in claim 6, wherein said setting means initiates the function setting mode when said operating button is depressed while a power switch of the apparatus is turned on.

8. The operating panel as claimed in claim 6, said operating panel further comprising:

one or more display lamps; and display control means for driving and controlling said one or more display lamps according to a first mode to indicate said inputting period of time when said setting means is in operation, and according to a second mode to indicate a state of the apparatus.

9. An operating panel for an apparatus comprising:

a single operating button; and setting means for recognizing a setting code inputted via said operating button when said operating button is operated within a predetermined inputting period of time, and for setting a functional item of the apparatus corresponding to said setting code thus recognized;

wherein said functional item is among a plurality of functional items which may be set for the apparatus; and wherein there are a plurality of predetermined setting codes for inputting via said control panel, and at least one of said plurality of predetermined setting codes corresponds to two or more designated functional items of the apparatus, such that only one of said designated functional items is used by the apparatus at a given time.

10. An operating panel for an apparatus comprising:

a single operating button; and setting means for recognizing a setting code inputted via said operating button when said operating button is operated within a predetermined inputting period of time, and for setting a functional item of the apparatus corresponding to said setting code thus recognized;

wherein said functional item is among a plurality of functional items which may be set for the apparatus;

wherein said inputting period of time includes a plurality of phases; and wherein said setting means recognizes said setting code by counting the number of times of depression of said operating button during each of said phases, respectively, whereby the number of depressions counted during each phase is a numerical value corresponding to a digit of a plural-digit number.

11. The operating panel as claimed in claim 10, said operating panel further comprising:

one or more display lamps; and display control means for driving and controlling said one or more display lamps by turning on said one or more display lamps in different ways corresponding to said different phases.

12. The operating panel as claimed in claim 10, wherein said setting means recognizes the number of times of depression of said operating button as the numerical value of a digit only when the number of times of depression of said operating button in each phase is equal to or less than a predetermined maximum value.

13. The operating panel as claimed in claim 12, wherein when the number of times of depression of said operating button exceeds said predetermined maximum value, said setting means clears a value representing the number of times of depression of said operating button which has been counted in the same phase.

14. The operating panel as claimed in claim 12, wherein when the number of times of depression of said operating button exceeds said predetermined maximum value, said setting means clears a value representing the number of times of depression of said operating button which has been counted in the inputting period of time.

15. An operating panel comprising:

a single operating button;

setting means which counts the number of times of depression of said operating button in each of N phases, where N is two or more, in a predetermined inputting period of time, to recognize the number of times of depression counted in each of said N phases as a numerical value of a digit of a setting code of N digits;

one or more display lamps; and display control means for driving and controlling said one or more display lamps;

wherein said setting means is caused to operate when said operating button is depressed while a power switch is turned on;

wherein said setting means repeatedly provides said inputting period of time to input a plurality of setting codes;

wherein said setting means clears a value representing the number of times of depression of said operating button in said inputting period of time, when the number of times of depression of said operating button exceeds a predetermined maximum number in any one of said N phases of said inputting period of time, where the predetermined maximum number is more than N; and wherein said display control means turns on said one or more display lamps to separately indicate said phases of said inputting period of time when said setting means is in operation, and turns on said one or more display lamps to indicate a state of an attached apparatus when the operation of said setting means has been terminated.

16. A printer having an operating panel as claimed in any of claims 1 through 15, wherein the printer operates according to setting data supplied via said operating panel and from a host computer.

* * * * *